(12) United States Patent
Shekhar et al.

(10) Patent No.: US 9,025,768 B2
(45) Date of Patent: May 5, 2015

(54) SECURING VARIABLE LENGTH KEYLADDER KEY

(71) Applicant: Broadcom Corporation, Irvine, CA (US)

(72) Inventors: Shashank Shekhar, San Diego, CA (US); Shee-Yen Tan, Walnut, CA (US); Andrew Dellow, Minchinhampton (GB)

(73) Assignee: Broadcom Corporation, Irvine, CA (US)

( * ) Notice: Subject to any disclaimer, the term of this patent is extended or adjusted under 35 U.S.C. 154(b) by 62 days.

(21) Appl. No.: 13/856,651

(22) Filed: Apr. 4, 2013

(65) Prior Publication Data

US 2014/0258708 A1    Sep. 11, 2014

Related U.S. Application Data

(60) Provisional application No. 61/775,120, filed on Mar. 8, 2013.

(51) Int. Cl.
*H04L 9/00* (2006.01)
*H04L 29/06* (2006.01)
*G06F 13/28* (2006.01)
*H04L 9/08* (2006.01)

(52) U.S. Cl.
CPC ............ *H04L 63/0428* (2013.01); *G06F 13/28* (2013.01); *H04L 63/0435* (2013.01); *H04L 9/0822* (2013.01); *H04L 9/0861* (2013.01)

(58) Field of Classification Search
CPC ....... G06F 21/10; G06F 21/602; G06F 13/28; G06F 21/105; G06F 21/12; G06F 21/60; G06F 2121/604; G06F 2121/62; G06F 2121/6209; G06F 2121/6218; H04L 9/08; H04L 9/14; H04L 9/0861; H04L 9/0822; H04L 63/0435; H04L 63/0428
USPC .......................... 380/45; 726/26–33; 713/155
See application file for complete search history.

(56) References Cited

U.S. PATENT DOCUMENTS

| 8,572,408 | B2 * | 10/2013 | Candelore ...................... 713/193 |
| 2006/0288235 | A1 * | 12/2006 | Goto .............................. 713/190 |
| 2008/0005586 | A1 * | 1/2008 | Munguia ........................ 713/189 |
| 2009/0323971 | A1 * | 12/2009 | Munguia et al. ............... 380/284 |
| 2011/0060919 | A1 * | 3/2011 | Smith et al. .................... 713/189 |
| 2012/0224688 | A1 * | 9/2012 | Rodgers et al. ............... 380/203 |
| 2014/0189853 | A1 * | 7/2014 | Epp et al. ........................ 726/18 |

* cited by examiner

*Primary Examiner* — Fikremariam A Yalew
*Assistant Examiner* — Amie Lin
(74) *Attorney, Agent, or Firm* — Brinks Gilson & Lione (57) ABSTRACT

A system for securing a variable length keyladder key includes a keyladder decryptor configured to alter a first layer key and to execute a keyladder algorithm to generate a content key, the keyladder algorithm to generate the content key by decrypting an encrypted second layer key with the altered first layer key. The alteration mirrors the alteration applied to encrypt the second layer key by a content server providing content data to be decrypted. The system may further include a cryptographic direct memory access controller (DMAC) coupled with the keyladder decryptor and to decrypt encrypted content data using the generated content key. The keyladder decryptor may be further configured to send the content key to be stored in the DMAC without information regarding how the first layer key was altered. The alteration may include a permutation function or other change or modification.

21 Claims, 5 Drawing Sheets

SECURING VARIABLE LENGTH KEYLADDER KEY

CROSS REFERENCE TO RELATED APPLICATIONS

This application claims the benefit of priority to U.S. Provisional Application No. 61/775,120, filed Mar. 8, 2013, which is incorporated herein by this reference.

TECHNICAL FIELD

This disclosure relates to content decryption, and more particularly, to securing a variable length keyladder key that is used to generate a content key for content decryption.

BACKGROUND

Rapid advances in electronics and communications technologies, driven by consumer demand, have resulted in the widespread adoption of data-driven devices, including those for handling and converting third-party media content. Third-party customers or clients want their content handled with security such that the content is not copied or used outside of certain permission levels, which in some cases means allowing access to content only when providing a proper decryption key. Conditional access (CA) or digital rights management (DRM) systems that stream content digitally for media providers may need to generate a decryption key from a variable length keyladder key for use in content decryption, as a way to secure access to encrypted media stored in memory of consumer media boxes.

BRIEF DESCRIPTION OF THE DRAWINGS

The systems and methods may be better understood with reference to the following drawings and description. In the figures, like reference numerals designate corresponding parts throughout the different views.

DETAILED DESCRIPTION

The discussion below makes reference to content decryption, and more particularly, to securing a variable length keyladder key that is used to generate a content key for content decryption. Securing the keyladder key can ensure that an untrusted application that is attempting to access encrypted content through a host processor (or central processing unit (CPU)) is only allowed access if the application supplies the proper permutated version of an encrypted keyladder key. Client media boxes may be adapted with a keyladder decryptor to generate a content key in the clear from an encrypted keyladder key, but through use of a permutated function that results in applying the same permutation function to decrypt the encrypted keyladder key at each keyladder layer as was used to encrypt the keyladder key at an authorized content server. The permutation function, however, is not available to a cryptographic direct memory access controller (DMAC) that is responsible for performing the content decryption.

Figure 1:
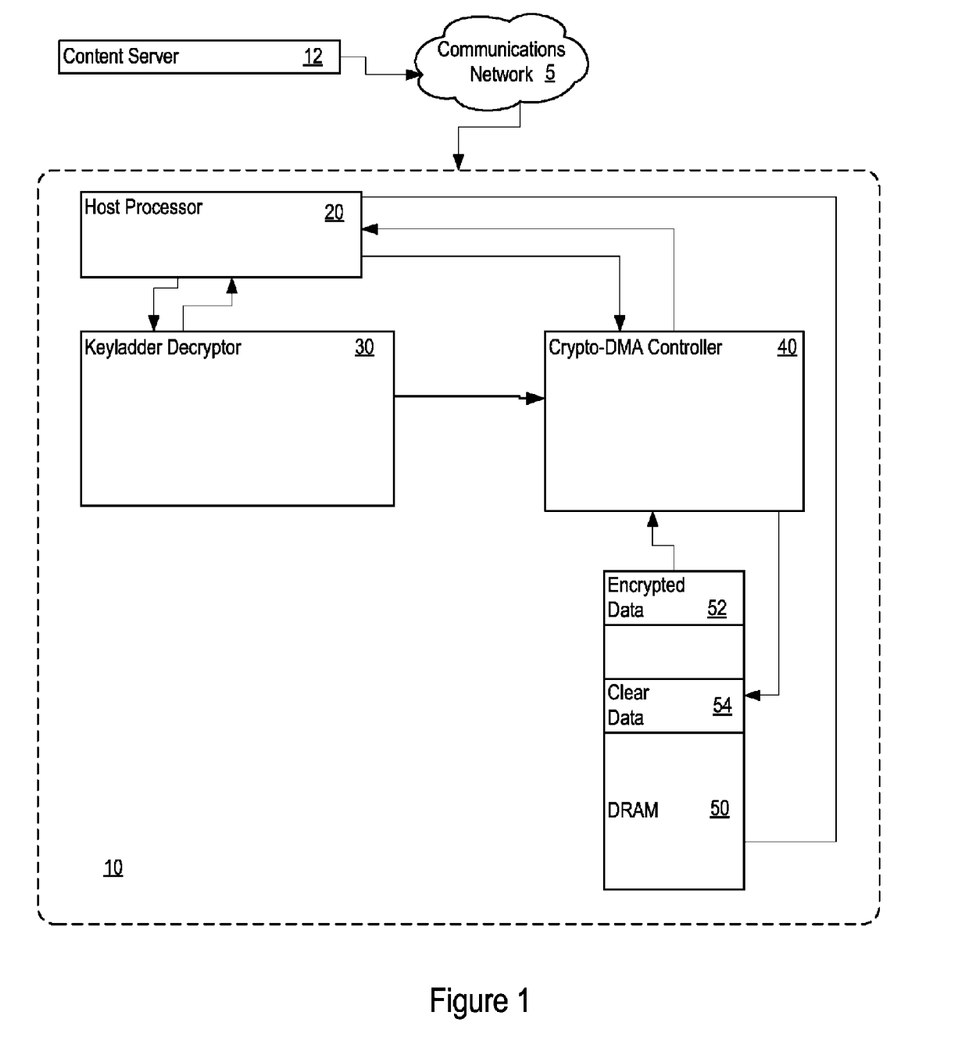
FIG. 1 is a block diagram of an exemplary system for decrypting content after generation of a variable length keyladder key.

FIG. 1 is a block diagram of an exemplary system 10 for decrypting content after generation of a variable length keyladder key. The system 10 may be an audio/video (AV) client box or set-top box configured to decrypt media content for display on a receiving AV device such as a television, monitor or other display.

A content server 12 may communicate with a host processor 20 (or central processing unit (CPU)) over a communications network 5. The content server 12 may send encrypted keys and data (such as packetized media content) and request generation of a content key by a keyladder decryptor 30 with which to decrypt the data. The keyladder decryptor 30 may execute a keyladder algorithm on an encrypted keyladder key received from the content server to generate the content key. As will be explained in more detail, the keyladder algorithm may be iteratively executed on successively lower layer keys until the unencrypted content key is generated. Or, a key received from the server may itself be the requested content key, which is then retrieved without decryption. After the content key is generated or retrieved, the content key may be sent to a cryptographic direct memory access controller (DMAC) 40 for use in content data decryption.

The DMAC 40 may retrieve the encrypted data 52 saved in dynamic random access memory (DRAM) 50 and decrypt the data using the generated content key. After decryption, the DMAC 40 may save the decrypted data as clear data 54 into DRAM 50. Once the decrypted data is available in DRAM, the DMAC 40 may inform the host processor 20 that the decrypted data is available for access.

Digital data processing may include manipulating data based on a computer algorithm. The host processor (or master CPU) performs basic functions such as fixed-point arithmetic using an arithmetic logic unit module. But complex algorithms may demand more computing resources and are executed in dedicated data processing modules with very minimal CPU help. With the advent of System-On-Chip (SOC) technology, engineers are able to implement highly specialized and complex algorithms inside an Application Specific Integrated Circuit (ASIC). This can result in very fast computations since the CPU, fast static random access memory (SRAM) memory, direct memory access (DMA) Controller and data processing modules may all be located inside the ASIC.

A DMA Controller (DMAC) may be a dedicated device that is programmed by the CPU to perform a sequence of data transfers on behalf of the CPU. The DMAC may directly access memory and be used to transfer data from one memory location to another or from an in/out (I/O) device to memory and vice versa. The DMAC manages several DMA channels, each of which can be programmed to perform a sequence of DMA transfers. A DMAC typically shares a system memory and I/O bus with the CPU. This architecture enables the DMAC to operate in parallel with the CPU to some extent, but may require that the DMA channel first be programmed by the CPU using a descriptor table. This table may contain all the necessary information to initiate, monitor and sustain the DMA operation. The DMAC interrupts the CPU whenever a DMA channel terminates. This architecture requires less CPU time than that of servicing interrupts or polling if DMA were not used.

Figure 2:
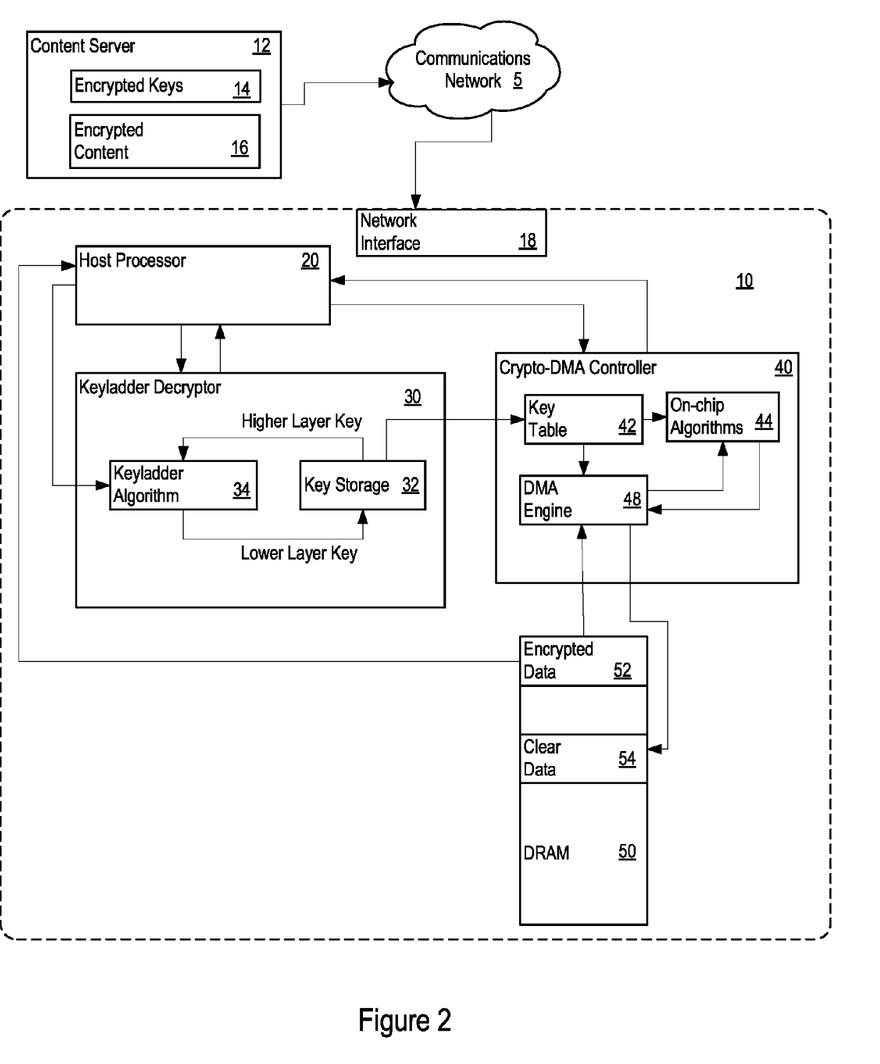
FIG. 2 is a more-detailed block diagram of the exemplary system for decrypting content shown in FIG. 1.

FIG. 2 is a more-detailed block diagram of the exemplary system 10 for decrypting content shown in FIG. 1. The content server 12 may store the encrypted keys 14 and encrypted content 16 that may be transmitted together to the client box 10 through the network 5 and to a network interface 18 of the system 10. The encrypted keys 14 and encrypted content 16 may be stored as the encrypted data 52 in DRAM 50. The encrypted keys may include an encrypted keyladder including a highest (or first) layer key, a source key, and one or more encrypted lower layer keys in need of decryption to move deeper into the keyladder and ultimately obtain a content key for use in decrypting the encrypted content data 52. The content key may be found on the lowest rung or layer of a particular keyladder.

The host processor 20 may direct the encrypted keys to the keyladder decryptor 30 to generate the content key for use in the decryption. The keyladder decryptor 30 may include key storage 32 in which to store keyladder keys and generated sub-keys, and a keyladder algorithm 34 used to decrypt encrypted lower layer keys of the keyladder. A decryption algorithm may include two inputs, a secret or key and encrypted data to be transformed, e.g., unencrypted. In the case of a keyladder algorithm, however, the encrypted data to be transformed is a next, encrypted lower layer key at least until the unencrypted content key finally results. A first layer (or source) key may be sent to the host processor 20 from the encrypted data 52 of DRAM as a first input to the keyladder algorithm 34. An encrypted lower layer key (also supplied by the content server) may be sent as a second input to the keyladder algorithm 34, which is then executed iteratively as will be explained.

Accordingly, the keyladder algorithm may then be executed on the first layer (or source) key and the encrypted first lower layer key, to decrypt the encrypted first lower layer key, generating a first sub-key, which may then be stored in the key storage 32. The keyladder algorithm may then be applied again on the first sub-key and the encrypted second lower layer key (that may be retrieved from the encrypted data 52), to decrypt the encrypted second lower layer key, generating a second sub-key that is stored in the key storage 32. Each of the lower layer keys may thus be decrypted into sub-keys, also referred to as intermediate keys that are used in further key decryption steps. This process may repeat itself as many times as necessary through the sequential layers of the keyladder until the unencrypted content key resides in the key storage 32. The process may only need to be executed once, or may need repeating depending on how many encryption layers were used to encrypt the highest layer encrypted key at the content server 12.

The unencrypted content key may then be sent to be stored in the key table 42 of the DMAC 40, for use in decrypting the encrypted content data 52, such as encrypted media content. The DMAC 40 may further include on-chip algorithms 44 for use in locally generating content keys and a direct memory access (DMA) engine 48 used to perform decryption and in some cases to execute the on-chip algorithms. Only the unencrypted content key may successfully decrypt the encrypted content data 52, so if a third-party content server sends the wrong encrypted keys, the content data will remain encrypted.

In performing the decryption, the DMA engine 48 may use the unencrypted content (or final keyladder) key to decrypt the encrypted content data from DRAM 52, generating the clear content data for storage back into DRAM 54 that is then accessible by a requesting application. Once the decrypted data is available as clear content data in DRAM 54, the DMAC 40 may inform the host processor 20 that the decrypted data is available for access.

The decryption process may be further secured by operating the keyladder decryptor 30, the key table 42 and the on-chip algorithms 44 in a secure domain. A secure domain may be one that isolates, through separate hardware and/or virtually in software, the buses, processors and the like used to manipulate and transfer secure data, keeping these structures separate from unsecured processes, structures and buses on the same SOC. Intermediate keys and a final content key may be stored in the secure domain, otherwise an untrusted application software could gain access to the content keys and the system would not be able to provide assurance of secrecy of such keys.

Vulnerability still exists, however, in that common encryption algorithms such as Advanced Encryption Standard (AES) or Triple Data Encryption Algorithm (triple-DES) may be employed in generation of the encrypted keys. These same algorithms are commonly executed by DMACs that are used on AV client boxes 10. The DMA engine 48 of the DMAC 40 may also execute one of these on-chip algorithms to generate a content key for use by the DMA engine 48 performing the content data decryption. If the final, unencrypted content key used by the DMA engine 48 of the DMAC 40 for decryption may be generated with the same algorithm as the keyladder algorithm used to derive the final content key, and the keyladder has no restriction on its depth, than a lower layer key that is shallower in depth than the final content key could be routed to the DMAC 40, e.g., by an untrusted application, to trick the DMAC 40 into generating the unencrypted content key.

More specifically, the untrusted application could guess a secret, and apply the common algorithm to the secret one or more times to generate the encrypted lower layer key (if not the highest layer encrypted key). In such a case, the untrusted application could use the DMAC with the keyladder algorithm and the shallower key to reveal the next stage of the keyladder key in the clear in DRAM. The result may allow the untrusted application to see all of the deeper intermediate keyladder keys up to the final content key as executed by the DMAC 40, a loophole in the encryption process resulting from the ease by which the untrusted application may trick the DMAC 40 into generating the final content key.

Figure 3:
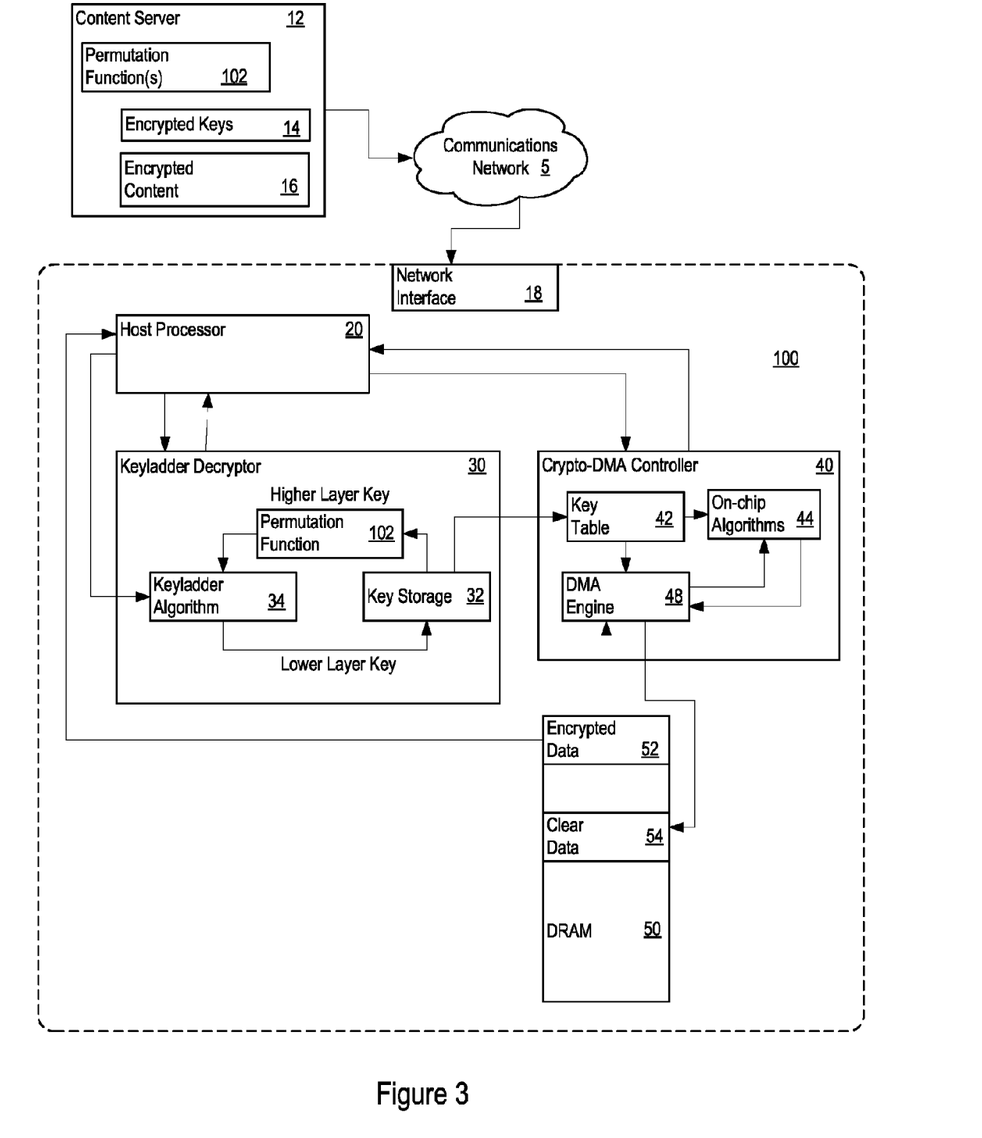
FIG. 3 is a block diagram of an exemplary system for securing a variable length keyladder key when generated for use in content decryption.

FIG. 3 is a block diagram of an exemplary system 100 for securing a variable length keyladder key when generated for use in content decryption. The system 100 may be an audio/video (AV) client box or set-top box configured to decrypt media content for display on a receiving AV device such as a television, monitor or other display.

To resolve the vulnerability in which the DMAC 40 could be tricked to generate locally the final content key needed for content decryption, the system 100 of FIG. 3 includes a permutation function 102, or other alteration, that may be executed on higher layer sub-keys or decrypted keys before the keyladder algorithm is executed thereon to decrypt the encrypted lower layer keys. The permutation function may provide a means by which to alter or otherwise change or modify the higher layer keyladder key before it is input into the keyladder algorithm.

A trusted content server 12 may apply the same alteration or permutation function 102 to the encrypted keyladder keys before being sent to the secure AV client box 100. The client box 100 is preconfigured with the permutation function 102 stored in the keyladder decryptor, where the client box 100 and the content server 12 prearrange for use of the same permutation function. The permutation function 102 may also be updated later where the client box 100 may download a new permutation function from the server, and replace the previous permutation function with the new permutation function in the keyladder decryptor 30. The host processor may send the permutation function 102 to the keyladder decryptor 30 only through secure domain channels to which the DMAC 40 does not have access. The permutation function 102 may be less common, unknown and very difficult to guess.

The permutation function 102 may generate a permutated or altered keyladder key of the highest layer encrypted key used to decrypt, by application of the keyladder algorithm, the first encrypted lower layer key to generate a first sub-key of the keyladder. If the unencrypted content key has not yet been generated, the permutation function may be applied to the first sub-key before the keyladder algorithm is executed on the permutated first sub-key and on an encrypted second lower layer key. This second iteration would then generate a second sub-key.

Because the permutation function 102 was applied when the content server encrypted the keyladder keys, the resulting sub-keys each become the correct next layer key, which the keyladder decryptor considers the higher layer key. This keyladder key decryption process may iterate through sequential keyladder layers, each generating a subsequent sub-key or intermediate key, until a final, unencrypted content key is saved in the key storage 32 of the keyladder decryptor 30.

The unencrypted content key may then be sent for storage in the key table 42 without the permutation function 102. The DMA engine 48 may then decrypt the encrypted content data as discussed with reference to FIG. 2, with use of the content key. The permutation function 102 is therefore not stored in or ever made accessible to the DMAC 40 of the AV client box 100. Accordingly, there is no way an untrusted application could replicate generation of the final content key: to do so, the DMAC would require the permutation function, but because the permutation function resides in the secure domain, the DMAC cannot access the permutation function.

The secure domain of the system 100, however, need not be configured to guarantee that a keyladder key is gong to be altered using the permutation function. Without making this guarantee, the design of the keyladder as applied in the secure domain may be simplified. More specifically, a host application running on the client box 100 in non-secure domain can decide whether or not to apply the permutation function to the keyladder in the secure domain to generate the content key. If the host application does not select to apply the permutation function option with the keyladder, and the content server 12 had used the permutation function to generate the keyladder, then the client box 100 would have the wrong sub-key and therefore fail to generate the content key needed for decryption of the encrypted content 16. By not requiring a guarantee that the keyladder be altered using the permutation function, the system 100 provide additional uncertainty to would-be hackers trying to decide what alteration to make and when.

The permutation function 102 executed on a keyladder key may be one that is publicly known or may be secret or privately created. The security of the content decryption may, therefore, not depend on the secrecy of the permutation function as much as on the secrecy of an intermediate key. A potential hacker could know the permutation function but still not be able to generate the intermediate key. If the intermediate key is known, however, then the keyladder key is already broken.

The permutation function 102 may include, but not be limited to a bit or byte reversal function. The permutation function may further include a bit-mixing function including a non-standard cryptographic algorithm, e.g., a private algorithm unlike AES or triple-DES or other standard, known algorithms used for encryption/decryption. A digest may be created on the bit-mixed keyladder key and a portion of the digest may be extracted to create the permutated keyladder key on which the keyladder algorithm is executed. Accordingly, different levels of sophistication may be used to create a permutation function that would be difficult to replicate.

Figure 4:
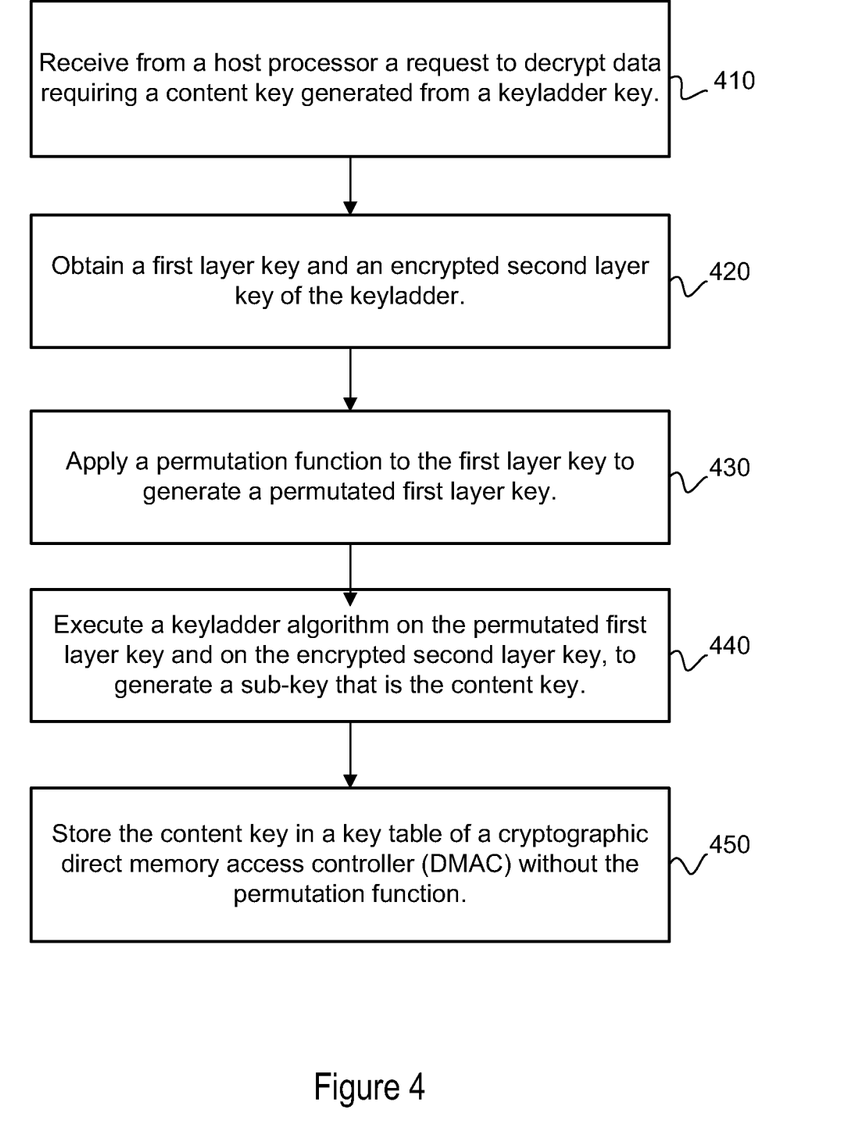
FIG. 4 is a flow chart of an exemplary method for securing a variable length keyladder key when generated for use in content decryption.

FIG. 4 is a flow chart of an exemplary method for securing a variable length keyladder key when generated for use in content decryption. A keyladder decryptor may receive from a host processor of a computing system a request to decrypt encrypted content data with a content key generated from a keyladder (410). The keyladder decryptor may further obtain a first layer key and an encrypted second layer key of the keyladder (420). The keyladder decryptor may further apply a permutation function to the first layer key to generate a permutated first layer key (430). The keyladder decryptor may then execute a keyladder algorithm on the permutated first layer key and on the encrypted second layer key, to decrypt the encrypted second layer key, generating a sub-key comprising the content key (440). The keyladder decryptor may also store the content key in a key table of a cryptographic direct memory access controller (DMAC) without the permutation function (440).

Figure 5:
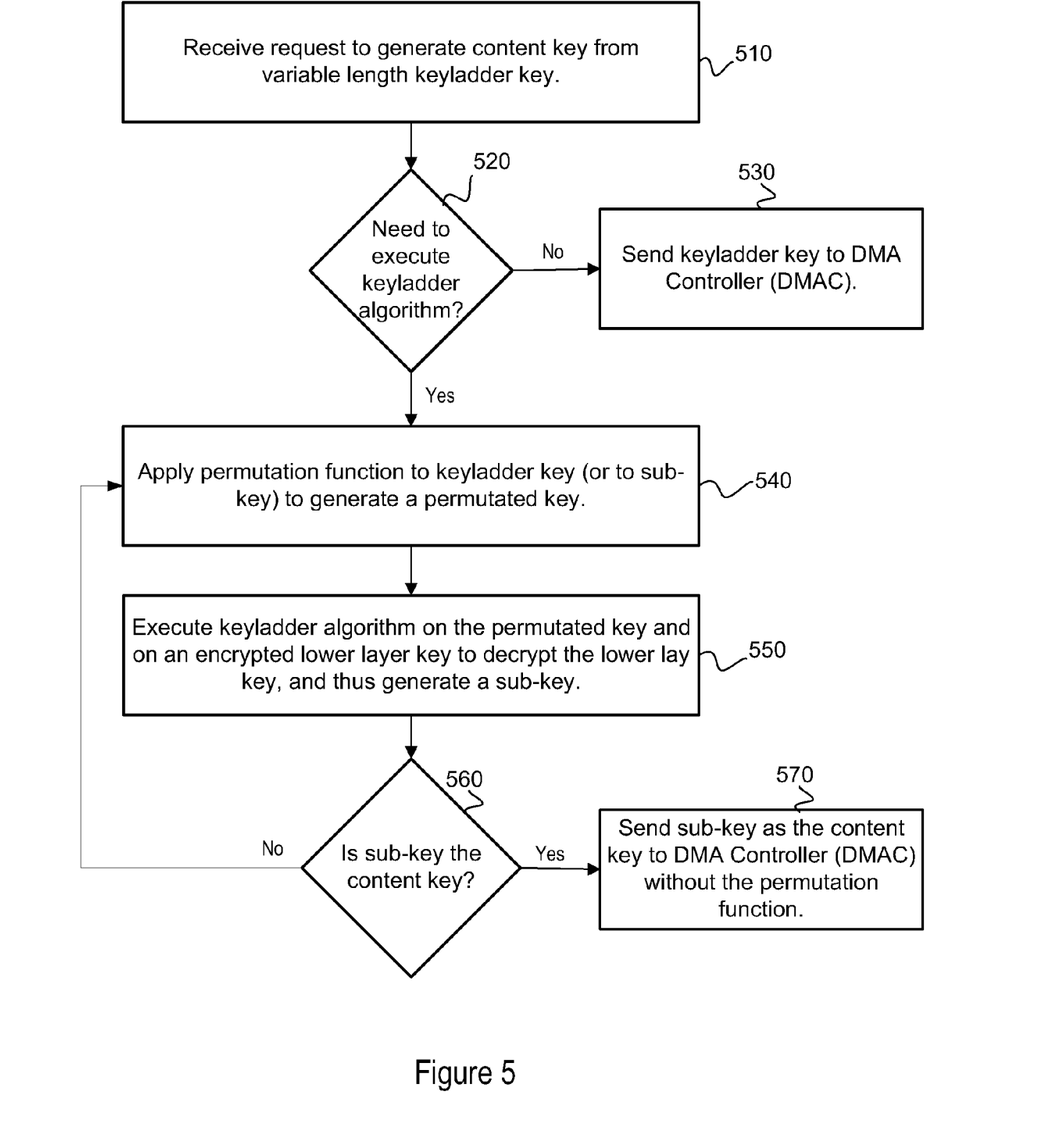
FIG. 5 is a flow chart of another exemplary method for securing a variable length keyladder key when generated for use in content decryption.

FIG. 5 is a flow chart of another exemplary method for securing a variable length keyladder key when generated for use in content data decryption. The keyladder decryptor may receive a request to generate a content key from a variable length keyladder key (510). The keyladder decryptor may decide whether there is a need to execute a keyladder algorithm (520). For example, if the content key resides in the key storage of the keyladder decryptor (or in DRAM), the keyladder decryptor may not need to execute a keyladder algorithm, and may send the content key to the DMAC to use in content data decryption (530).

When the keyladder decryptor does need to execute the keyladder algorithm, the keyladder decryptor applies a permutation function to the keyladder key to generate a permutated keyladder key (540). The keyladder decryptor may then execute the keyladder algorithm on the permutated keyladder key and on an encrypted lower layer key to decrypt the lower layer key, to thus generate a sub-key (550), in this case a first sub-key of what may be a string of layered sub-keys.

The keyladder decryptor may then determine whether the sub-key is the content key (560). If so, the keyladder decryptor may send the content key to the DMAC for use in content data decryption, but without the permutation function (570). Otherwise, the sub-key may be sent again through steps 540 and 550, in which the permutation function is applied to the sub-key (540) and the keyladder algorithm is again executed on the permutated sub-key and an encrypted next lower layer key to generate the next sub-key (550). Steps 540 through 560 may be iteratively executed until the content key is generated, which may then be sent to the DMAC for use in content data decryption, but without the permutation function (570).

The host processor 20 may, therefore, keep track of the iterations through the keyladder decryption process, where the ladder length is predefined by the content server 12 and agreed to ahead of time with the client box 10. If the host processor is compromised and sends the key to the DMAC too early, then the lack of a permutation function may render the generated key useless. On the other hand, if the host processor sends the generated key too late, the result is effectively random and there is no threat.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system, comprising:
a direct memory access controller (DMAC) and a keyladder decryptor unit coupled with each other, where,
the keyladder decryptor unit is configured to alter a first layer key and generate a content key by decryption of an encrypted second layer key with the altered first layer key, where the decrypted second layer key comprises a first sub-key,
the keyladder decryptor unit further is configured to alter the first sub-key and decrypt an encrypted third layer key with the altered first sub-key, where the decrypted third layer key comprises a second sub-key that comprises, or is used for the generation of, the content key; and
the DMAC is configured to decrypt encrypted content data using the generated content key; and
where the keyladder decryptor unit is further configured to send the content key to the DMAC.

2. The system of claim 1, where the keyladder decryptor unit is configured to alter the first layer key with a permutation function used to encrypt the first layer key at a content server.

3. The system of claim 2, where the permutation function includes a bit-mixing function comprising a private cryptographic algorithm, and where the keyladder decryptor unit is further configured to:
create a digest of the bit-mixed first layer key; and
extract a portion of the digest of the bit-mixed first layer key for use by the keyladder decryptor unit.

4. The system of claim 2, where the permutation function comprises bit reversal function or a publically known function.

5. The system of claim 2, further comprising a host processor coupled with the keyladder decryptor unit and the DMAC and configured to deny the DMAC access to the permutation function.

6. The system of claim 2, where the permutation function comprises a function that: mixes the first layer key with a secret constant; or operates on the first layer key with a secret function in a secure domain of the system.

7. The system of claim 1, further comprising a host processor coupled with the keyladder decryptor unit and the DMAC, and where the DMAC is further configured to:
retrieve the encrypted content data from dynamic random access memory (DRAM);
decrypt the encrypted content data with the generated content key; and
store the decrypted content data in the DRAM.

8. A method, comprising:
receiving, from a host processor, a request to decrypt encrypted content data with a content key generated from a keyladder;
obtaining, by a decryptor, a first layer key and an encrypted second layer key of the keyladder;
receiving, by the decryptor, a permutation function from a server;
generating, by the decryptor, a permutated first layer key by applying the permutation function, received from the server, to the first layer key;
decrypting, by the decryptor, the encrypted second layer key based on the permutated first layer key and the encrypted second layer key to generate the content key; and
transmitting, by the decryptor, the content key to a cryptographic direct memory access controller (DMAC) for decrypting the content data.

9. The method of claim 8, where the permutation function comprises a byte reversal function or a publicly known function.

10. The method of claim 8, further comprising:
storing the keyladder in a secure domain that includes restricted access to system components.

11. The method of claim 10, further comprising:
not requiring the secure domain to guarantee that the permutation function be applied in the secure domain.

12. The method of claim 8, where the permutation function includes a bit-mixing function comprising a private cryptographic algorithm, further comprising:
creating a digest of the bit-mixed first layer key; and
extracting a portion of the digest of the bit-mixed first layer key for the decryption by the decryptor.

13. The method of claim 8, further comprising the DMAC:
decrypting the encrypted content data with the content key; and
storing the decrypted content data to direct random access memory.

14. The method of claim 8, where a first sub-key is generated before generation of the content key, and the method further comprising:
applying the permutation function to the first sub-key to generate a permutated sub-key; and
decrypting an encrypted third layer key based on the permutated sub-key and the encrypted third layer key for generating a second sub-key that is, or is used in generation of, the content key.

15. A method, comprising:
receiving, from a host processor, a request to decrypt encrypted content data with a content key generated from a keyladder;
retrieving a source key and encrypted layer keys of the keyladder;
applying a permutation function to the source key to generate a permutated source key;
executing a keyladder algorithm on the permutated source key and on an encrypted second layer key, to decrypt the encrypted second layer key to generate a first sub-key;
applying the permutation function to the first sub-key;
executing the keyladder algorithm on the permutated first sub-key and on an encrypted third layer key, to decrypt the encrypted third layer key to generate a second sub-key;
iteratively performing applying the permutation function and executing the keyladder algorithm on successive sub-keys until a generated sub-key comprises the content key;
storing the content key in a key table of a cryptographic direct memory access controller (DMAC) without the permutation function, the content key for decrypting the content data; and
denying the DMAC access to the permutation function.

16. The method of claim 15, further comprising:
storing the keyladder in a secure domain that includes restricted access to system components; and
denying the DMAC access to the secure domain.

17. The method of claim 15, where the permutation function comprises a publically known function.

18. The method of claim 15, where the permutation function comprises a function that: mixes a layer key or a sub-key with a secret constant; or operates on the layer key or the sub-key with a secret function.

19. The method of claim 16, further comprising:
decrypting the encrypted content data with the content key;
storing the decrypted content data in an unsecured portion of dynamic random access memory (DRAM); and
signaling to the host processor that the decrypted content data is available in DRAM for streaming.

20. An apparatus, comprising:
circuitry configured to alter a first layer key based on a permutation function received from a server;
circuitry configured to generate a content key by decryption of an encrypted second layer key based on the altered first layer key;
a direct memory access controller (DMAC) configured to receive the generated content key; and
the DMAC further configured to decrypt encrypted content data using the generated content key.

21. The apparatus of claim 20, further comprising a host processor configured to deny the DMAC access to the permutation function.

* * * * *